United States Patent

[11] 3,631,765

[72] Inventor Otto Neumeister
 Muhlacker 13a, D-7106 Neuenstadt am Kocher, (Baden Wurttemberg), Germany
[21] Appl. No. 11,200
[22] Filed Feb. 13, 1970
[45] Patented Jan. 4, 1972
[32] Priority Feb. 15, 1969
[33] Germany
[31] P 19 07 689.2

[54] SINGLE-STAGE AND MULTISTAGE HYDRAULIC CYLINDERS, WITH PROTECTION AGAINST TWISTING
 8 Claims, 4 Drawing Figs.

[52] U.S. Cl. .................................................. 92/52, 92/53, 92/178, 308/6 B
[51] Int. Cl. .................................................. F01b 7/20
[50] Field of Search .......................................... 92/31, 51, 52, 53, 178; 308/6 B

[56] References Cited
UNITED STATES PATENTS
| 2,952,145 | 9/1960 | Thompson | 308/6 B |
| 3,203,202 | 8/1965 | Brownyer | 308/6 B |
| 1,175,609 | 3/1916 | Cottrell | 92/51 X |
| 1,928,533 | 9/1933 | Goss | 92/53 |
| 2,942,580 | 6/1960 | Siravo | 92/31 |
| 3,147,829 | 9/1964 | Johnson et al. | 92/53 X |
| 3,279,755 | 10/1966 | Notenboom et al. | 92/53 X |
| 3,437,271 | 4/1969 | Hammelmann | 92/31 X |
| 3,523,564 | 8/1970 | Jonsson et al. | 92/31 X |

FOREIGN PATENTS
| 750,541 | 5/1933 | France | 92/51 |

Primary Examiner—Edgar W. Geoghegan
Assistant Examiner—Irwin C. Cohen
Attorneys—Robert E. Burns and Emmanuel J. Lobato ABSTRACT: Relative rotation between the members of a multistage hydraulic unit comprising a cylinder member, a piston member and telescopic tube members interposed between the piston and cylinder is prevented by a ball or rounded projection on one element extending into a longitudinal groove of the next adjacent element. The grooves are of arcuate cross section with a depth less than the thickness of the respective member, and extend from near the inner end of the member to a point spaced from the outer end. Outer end portions of the member have smooth surfaces providing a fluidtight seal between them.

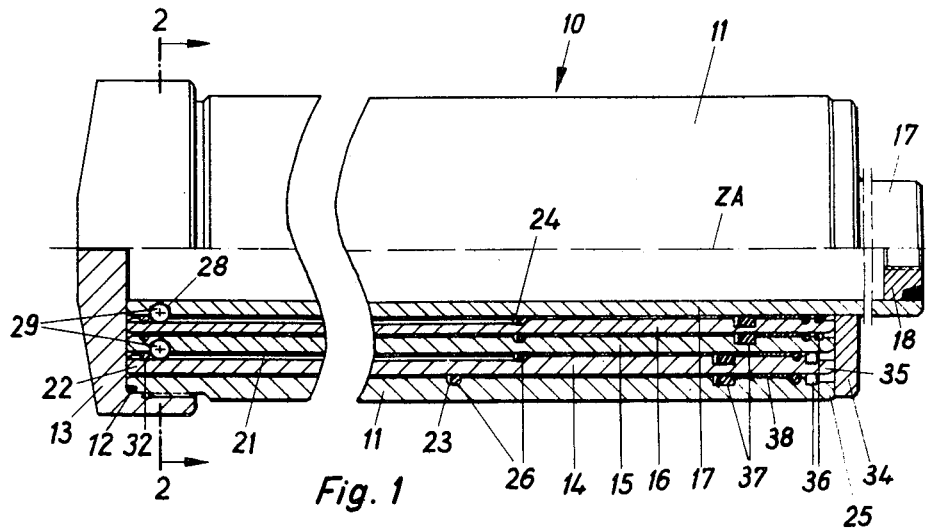
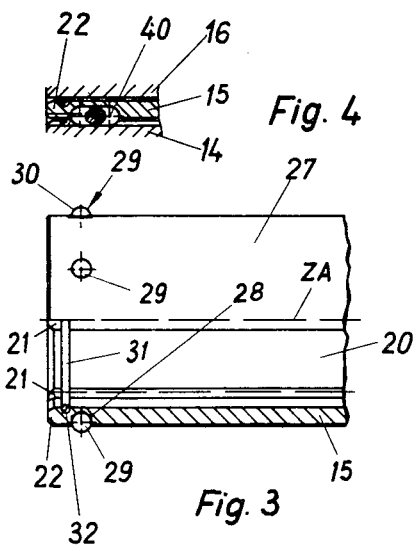
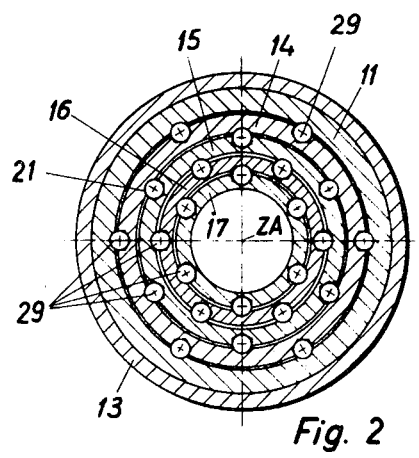

SINGLE-STAGE AND MULTISTAGE HYDRAULIC CYLINDERS, WITH PROTECTION AGAINST TWISTING

This invention relates to a single-stage or multistage hydraulic cylinder with a piston rod and possible further telescopic tubes, and with protection against twisting of the piston rod relatively to the cylinder.

The pistons, with the piston rods, of normal hydraulic cylinders, can be rotated in the cylinder tubes, according to loading and sealing, without any considerable expenditure of power. They therefore cannot be employed, without auxiliary means or guides, for devices in which twisting must not occur, such as lifting tables, travelling baskets or cages, assembly stages or platforms and so forth.

With single-stage hydraulic cylinders, means for preventing twisting admit of being accommodated comparatively easily in a hollow piston or discharge tube in the form of a hexagonal, square or splined shaft, or a flat-slot breakthrough, with corresponding counter guide. With multistage hydraulic cylinders, the accommodation of such precautions against twisting within the tube block is not economical, and above all, the external diameter of the tube block as a whole is increased. Furthermore, the entire torsional play or clearance, brought about by the requisite sliding fit, is always greater, the more the means of protection against twisting approach the center point.

For this reason, in multistage hydraulic cylinders, there is mostly employed, as a protection against twisting, a separate, externally located guide, or two multistage hydraulic cylinders spaced apart. This is expensive, and requires an amount of space which is frequently not available. With multistage hydraulic cylinders there have also already been employed means for protection against twisting in which the external peripheral surfaces of the telescopic tubes and pistons are provided with flats extending beyond a length corresponding to the stroke. To these plates are attached corresponding counterguide pieces. Keyway guides, which permit the smallest torsional clearance, and would be the easiest to construct on the external peripheral surfaces, are avoided, with a view to precluding the objectionable notch action. The flattening, which is also easy to construct, already results in a considerable torsional clearance, but with little guiding clearance. Moreover the external flattening causes a weakening of the tube cross section, which extends over a considerable part of its length in the region of the greatest stress, since it has to be made comparatively deep if it is to have a moderately small twisting clearance. These constructions also have the disadvantage that the cylinders cannot be constructed as plungers, and the peripheral surfaces cannot be used as sealing surfaces, so that the internal surfaces of the tubes can only with difficulty be kept free from the penetration of water, dirt, and so forth.

The present invention is based upon the problem of obviating the aforementioned disadvantages, and of providing means of protection against twisting, in which the outer marginal zones of the tubes are not interrupted, and which permit of being designed as plungers. According to the invention this can be obtained by cutting grooves, extending in the longitudinal direction of the cylinders in the inner wall surfaces of the cylinder, and, it may be, of the telescopic tubes, in which there engage elements such as balls, keys or the like, which, in the neighborhood of the ends of the piston rod and of the telescopic tubes that plunge into the cylinder, project out from the external surfaces of the piston rod and of the tubes. By avoiding extensive internal telescopic guides, therefore, the protection against twisting is effected by shifting the torsion guides to the internal wall surfaces of the tubes. By this means the external surfaces are available as sliding packing surfaces and surfaces for the stripping of dirt. This design or construction requires no increase, or at least no substantial increase in the diameter of the cylinder, and has the further advantage that the means for protection against twisting are located within the sealed chamber, and therefore are lubricated by the hydraulic oil. They do not in any way impair the sealing of the cylinder.

If, according to a further feature of the invention, the engaging elements, constructed as balls, are rotatably supported in the piston rod and in the tubes, the friction, even with considerable eccentric loadings or torsional loadings, in the protection against twisting, is considerably reduced, because the balls can revolve on their seats, and thereby prevent tendencies to seize.

If the supporting of the torsional forces by balls is not sufficient, it is possible, instead of the balls, to provide round keys with rounded tips, which still have very good antifriction properties, and reduce the surface pressures. The grooves or keyways are preferably constructed with arcuate cross sections which correspond to the surfaces of the balls or keys. In this way the notch effect is obviated or reduced, and advantageous supporting surfaces are obtained for the rolling bodies or other engaging elements.

If, during the stroke or lifting operation, a definite rotation in one or more stages is desired, this can be produced at the same time by the shape of the grooves or keyways. They are then still formed horizontally, and in the longitudinal direction, though not exactly in the direction of the cylinder axis, but spirally, or in some other suitable curved form.

The strokes of the individual tubes may at the same time be limited by the means for protection against twisting, by letting the engaging elements, such as balls or keys, run against corresponding abutments. These abutments admit of being very simply constructed as abutment rings. These are placed in ring passes provided at or near the ends of the grooves. One such ring pass is in any case needed at the end of the grooves, to enable the grooves to be accurately and cleanly broached or spaced. In order that the ball seats and the grooves or keyways machined from the external surfaces of the tubes may not touch one another in the internal surfaces of the tubes, and that no corresponding ruptures or weakenings may occur, they are preferably arranged in staggered relationship to one another.

Further features and advantages of the invention are dealt with in the following description, given in connection with the accompanying drawings, of two advantageous constructional examples. In these drawings, FIG. 1 shows a partial longitudinal section and a partial outside view of a multistage hydraulic cylinder unit with protection against twisting;

FIG. 2 shows a cross section along the line 2—2 in FIG. 1;

FIG. 3 shows partially in elevation, and partially in longitudinal section, an individual discharge tube, with longitudinal grooves, and with balls located therein; and FIG. 4 shows in section, in the region of the inner end, parts of three tubes of a further constructional example, with a round key.

The hydraulic cylinder unit 10 has an outer cylinder tube 11, which is screwed into a cylinder head 13, with the interposition of a packing 12. In the cylinder tube 11, telescopic tubes 14, 15 and 16, inserted individually into one another, as well as an inner piston rod tube 17 constituting a piston rod, are so arranged as to be longitudinally slidable. The piston rod tube 17 is provided in front with a coupling insertion 18.

In the internal wall surface 20 of each of the tubes 11, 14, 15 and 16 are machined six longitudinal grooves or keyway 21. These grooves are of arcuate cross section, and are drawn into the internal wall surfaces of the tubes with the aid of drawing heads. They extend from the inner ends 22, which telescope into the cylinder 10, to ring passes 23 and 24, which are located at some distance from the outer ends 25 and 35 of the tubes 11, 14, 15 and 16. This distance corresponds to the bearing length required for supporting a tube that has slid outwards. In the ring passes 23 and 24 are located abutment rings 26. In the external wall surface 27 of each of the tubes 14, 15, 16 and 17 are provided six ball seats 28, which, as illustrated by FIG. 2, are in staggered relationship to the grooves 21. These ball seats are arranged in the neighborhood of the ends 22 of the tubes. In the ball seats 28 are rotatably located hardened steel balls 29, which project at 30 out from the external surface of the tube 27 and engage fittingly in the grooves 21. They constitute, together with the grooves 21, the protection against relative rotation of the tubes.

In the constructional example illustrated, the grooves 21 are located exactly in the direction of the cylinder axis ZA, so that during the stroke no relative twisting is possible. The hardened steel balls 29 roll without sliding friction in the grooves.

At the front end of the stroke the balls 29 run against the abutment rings 26, whereupon the next tube in each case is caused to travel out. The balls 29 are stored in the region of the ends 22 of the tubes, so that the remainder of the external wall surfaces 27 are free from notches or the like. In the neighborhood of the ends 22 of the tubes, further annular entry passes 31 are introduced into the internal wall surfaces 20. In these are located further abutment rings 32, which prevent the telescopic tubes 14, 15, 16 and 17 collapsing inwards, singly or together, when the pistons have partially travelled outwards.

In order to relieve the abutment rings of load when the pistons have travelled in, and to support the thrust directly upon the cylinder tube 11, there is secured to the piston rod 17 an abutment plate 34, which is mounted upon the front end 25 of the cylinder tube 11 and upon the front ends 35 of the telescopic tubes 14, 15 and 16.

In the neighborhood of the front ends 25 and 35 of the cylinder tube 11 and of the telescopic tubes 14, 15 and 16, dirt strippers 36 are let into the internal wall surfaces 20 of the tubs. At a distance therefrom are located packing rings 37, which shut off the cylinder space from the exterior slidingly but in a pressuretight manner. Between the dirt strippers 36 and the packing rings 37 are located bearing and holding rings 38.

By the arrangement and construction described above, of the means of protection against twisting, a usual sealing of the individual tubes at the front ends can be effected, since the sealing surfaces are not interrupted. The means for protection against twisting are also located inside the space filled with hydraulic oil, and are thereby lubricated.

As FIG. 4 shows, in the neighborhood of the ends 22 of the tubes 14, 15, 16, 17, instead of the steel balls 29, round keys 40 may be provided, which are substantially of cylindrical construction, with hemispherical end caps. Since these keys have rather large rubbing surfaces, they can support greater torsional or lateral forces than steel balls, with less surface pressure. With these cylindrical keys, however, the advantage of rolling friction is lost.

The number of peripheral grooves and balls to be provided may be selected greater or smaller according to the particular needs and spatial relationships. Owing to the comparatively large number of guiding grooves, and the arrangement of rounded fitting tops 30 engaging therein, and above all the employment of rotatably supported balls, the torsional clearance obtained is very small, even with multistage cylinders.

If the complete prevention of all relative twisting is not desired, but only a definitely restricted twisting during the stroke, the grooves 21 in the internal wall surface 20 may be machined spirally or in some other suitable form.

Instead of the balls and round keys described; other correspondingly shaped engagement bodies, such as pins, or stamped impressions, may project into the grooves.

I claim:

1. A multistage hydraulic cylinder unit comprising a plurality of telescopically slidable members comprising a cylinder member having an inner end and an outer end, a piston member reciprocable in said cylinder and having an inner end and an outer end, and telescopic tube means comprising at least one tube member engaging slidably between said piston member and cylinder member, means between interengaging members to prevent relative rotation of said members while permitting limited longitudinal movement, said means comprising a groove in one of each two interengaging members and a single rotatable ball mounted in a mating spherical seat at the inner end of the other of said two members engaging in said groove, said groove being of arcuate cross section mating with said rotatable ball and with a depth less than the thickness of said one member and extending longitudinally from near the inner end of said one member to a point spaced from the outer end of said one member, interengaging surfaces of outer end portions of said members being smooth, and means providing a fluidtight seal between said outer end portions of said members.

2. A hydraulic cylinder unit as claimed in claim 1, wherein a plurality of circumferentially spaced grooves is provided in each of said grooved members with a corresponding plurality of rotatable balls and mating seats in each interengaging member.

3. A hydraulic cylinder unit as claimed in claim 2, wherein said tube member has said grooves in one surface and said rotatable balls and mating seats on the other surface, said grooves and rotatable balls and mating seats being circumferentially staggered relative to one another.

4. A hydraulic cylinder unit as claimed in claim 2, wherein said telescopic tube means comprises a plurality of telescopic interengaging tube members, each having said grooves in one surface and said rotatable balls and mating seats on the opposite surface.

5. A hydraulic cylinder unit as claimed in claim 1, wherein a radially extending plate on the outer end of said piston member is engageable with outer ends of said cylinder and tube members when said unit is in contracted condition.

6. A hydraulic cylinder unit as claimed in claim 1, wherein the sealing means comprises sealing rings set in circumferential grooves in said members near the outer ends thereof.

7. A hydraulic cylinder unit as claimed in claim 7, wherein dirt-stripper rings are provided between said members between said sealing rings and the outer ends of said members.

8. A hydraulic cylinder unit as claimed in claim 1, further comprising abutment rings at the ends of the grooves, to limit the movement of the engaging elements.

* * * * *